United States Patent [19]  [11] 3,976,625
Starmer  [45] Aug. 24, 1976

[54] VULCANIZABLE COMPOSITIONS CONTAINING DIENE/NITRILE POLYMERS HAVING ACTIVE HALOGEN SITES

[75] Inventor: Philip H. Starmer, Avon Lake, Ohio

[73] Assignee: The B.F. Goodrich Company, Akron, Ohio

[22] Filed: Dec. 26, 1974

[21] Appl. No.: 536,340

[52] U.S. Cl. ................ 260/79.5 P; 260/79.5 R; 260/79.5 C
[51] Int. Cl.² ................................ C08L 91/00
[58] Field of Search ............. 260/79.5 P, 79.5 PR, 260/79.5 C

[56] References Cited

UNITED STATES PATENTS

| | | | |
|---|---|---|---|
| 2,376,390 | 5/1945 | Semon | 260/79.5 P |
| 2,482,073 | 9/1949 | Stanton et al. | 260/79.5 P |
| 3,037,968 | 6/1972 | Cottle | 260/79.5 A |

Primary Examiner—Lewis T. Jacobs
Assistant Examiner—William E. Parker
Attorney, Agent, or Firm—Alan A. Csontos

[57] ABSTRACT

Compositions containing diene/nitrile polymers having active halogen sites are cured using zinc oxide and a thiourea compound to yield vulcanizates having excellent heat resistance.

13 Claims, No Drawings

VULCANIZABLE COMPOSITIONS CONTAINING DIENE/NITRILE POLYMERS HAVING ACTIVE HALOGEN SITES

BACKGROUND OF THE INVENTION

Diene/nitrile polymers, commonly called nitrile rubbers or NBR rubbers, are well known. The polymers are cured using sulfur or peroxide cure systems to yield vulcanizates having excellent original physical properties and good oil resistance. However, the vulcanizates have unsatisfactory resistance to oxidation on thermal aging. The use of antioxidants and stabilizers in these polymers has not provided a totally satisfactory solution. Attempts have been made to improve heat resistance by the use of special cure systems such as the cadmium-magnesium oxide cure system disclosed in an article by D. A. Paulin in Rubber Age, October, 1969, page 69. Unfortunately, the cadmium compounds are toxic, and thereby special handling precautions must be taken. It would be highly advantageous to have a diene-nitrile rubber composition that, upon cure, yields a vulcanizate having as good as or better heat aged resistance than is achieved using a cadmium-magnesium oxide cure system.

SUMMARY OF THE INVENTION

Diene-nitrile polymers having active halogen sites thereon are cured using a combination of zinc oxide and a thiourea compound. The vulcanizates have excellent original physical properties including good oil resistance, and exhibit excellent resistance to heat aging.

DETAILED DESCRIPTION

Vulcanizates having excellent physical properties, particularly having excellent heat aged properties, are prepared by curing a vulcanizable composition of (1) a diene/nitrile polymer having active halogen sites thereon, and (2) a cure system consisting essentially of a zinc oxide and a thiourea compound. As opposed to standard sulfur cures of diene/nitrile polymers which retain only about 50 percent or less of their tensile properties after heat aging for 70 hours at 150°C., the vulcanizates of the present invention retain about 75 percent and up to 90 percent or more of their tensile strength under the same conditions. Vulcanizate properties are similar to those obtained using a cadmium cure of diene/nitrile polymers. However, cadmium, a toxic material, is not employed.

The diene/nitrile polymer has active halogen cure sites thereon. The halogen cure sites are obtained by interpolymerizing a halogen-containing monomer with the diene and nitrile monomer, or by post-halogenating a polymer of interpolymerized diene and nitrile monomers.

The diene monomers employed are non-halogen containing conjugated diene monomers containing from 4 to about 10 carbon atoms. Examples of the diene monomers are butadiene, isoprene, 1,3-pentadiene, 2-isopropyl-1,3-butadiene, and the like. The preferred diene monomers are those containing 4 to 6 carbon atoms such as butadiene and isoprene. The interpolymerized diene monomer content of the polymer is from 50 percent to about 98 percent by weight of the total weight of the polymer.

The nitrile monomers employed are non-halogen containing monoolefinically unsaturated nitrile monomers containing 3 to about 6 carbon atoms such as acrylonitrile, methacrylonitrile, crotononitrile, and the like. The preferred nitrile monomers are acrylonitrile and methacrylonitrile. The interpolymerized nitrile monomer content of the polymer is from 1 percent to about 50 percent by weight of the total weight of the polymer. More preferredly, the weight content of the nitrile monomer is from about 15 percent to about 50 percent by weight.

The halogen-containing monomers are interpolymerized with the diene monomers and nitrile monomers in levels of from about 0.5 percent to about 20 percent, and more preferredly, from about 1 percent to about 5 percent by weight of the total weight of the polymer. The halogen-containing monomers are those having a "Q" value of from about 0.25 to about 3. The "$e$" value can be a positive or negative value, but, more preferredly, is a negative value. The "Q" and "$e$" values of the monomers are readily determined using the Q-$e$ scheme developed by Alfrey and Price, and Q-$e$ values for monomers are listed in many handbooks. (See R. W. Lenz, Organic Chemistry of Synthetic High Polymers, Interscience Publishers, N.Y., N.Y. (1967), pgs. 396–399, for an explanation of the Q-e scheme concept).

The halogen atom in the monomers is selected from the group consisting of chlorine and bromine. From a cost and availability viewpoint, chlorine-containing monomers are preferred. Examples of halogen-containing monomers within the scope of the invention are halogen-bearing vinylidene hydrocarbons such as vinyl benzyl chloride, vinyl benzyl bromide, 2-$\beta$-chloroisopropyl butadiene, $\alpha$-chloroacrylonitrile, and the like; and halogen-bearing vinylidene hydrocarbons containing oxy linkages such as halogen-containing acrylates such as methyl-$\alpha$-chloroacrylate, 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; and halogen-containing vinyl ketones such as chloromethyl vinyl ketone, 2-chloroethyl vinyl ketone, and the like. Examples of the more preferred halogen-containing vinylidene monomers are the resonance stabilized halogen-containing monomers having an allylic type halide structure such as vinyl benzyl chloride, and 2-chloroacetoxyethyl acrylate and methacrylate. Excellent results have been obtained using vinyl benzyl chloride as the halogen-containing monomer as it efficiently interpolymerizes with the diene and nitrile monomers and provides a highly reactive halide cure site on the polymers. The halogen content of the polymer ranges from about 0.2 percent by weight to about 5 percent by weight.

The diene/nitrile polymers having halogen cure sites thereon can also be obtained by interpolymerizing the diene and nitrile monomer and then post-halogenating the polymer via a chemical reaction. Techniques such as ultra-violet light and peroxide initiation of halogens or halide compounds such as carbon tetrachloride are known to the art. The halogen content of the polymer ranges from about 0.2 percent to about 5 percent by weight. Halogen contents of over 5 percent by weight are not necessary to acheive the improvements provided by the invention.

The interpolymers are prepared using standard polymerization techniques using known polymerization ingredients. As high conversions of monomer to polymer are desired, the preferred polymerization method is via emulsion polymerization which is typically initiated using peroxides or persulfates with or without a redox system. Various known emulsifiers can be used in standard amounts to create the emulsion. The polymer can be isolated via coagulation using metal salts such as $CaCl_2$ and $MgSO_4$, followed by washing with water, if desired.

The polymers are solid elastomers having a raw polymer mooney viscosity of from about 20 to about 100 or more (ML-4 at 212°F.).

The polymers of the invention are cured using a combination of a zinc oxide and a thiourea compound. The zinc oxide is used at from about 1 part to about 7 parts by weight, and more preferredly, from about 3 parts to about 5 parts by weight per 100 parts by weight of polymer.

The thiourea compound is thiourea, an aliphatic substituted thiourea, or a cyclic thiourea. Examples of aliphatic substituted thioureas are those of the formula

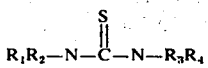

wherein $R_1$, $R_2$, $R_3$, and $R_4$ each can be hydrogen (if all four groups are hydrogen, the compound is thiourea), a phenyl group, a cycloalkyl of 4 to 8 carbon atoms, or an aliphatic or cycloaliphatic group containing 1 to about 12 carbon atoms, such as N-methyl thiourea, N-ethyl thiourea, N-t-butyl thiourea, N,N-dimethyl thiourea, trimethyl thiourea, tetramethyl thiourea, N,N-diethyl thiourea, N,N'-di-n-butyl thiourea, allyl thiourea, N-acetyl thiourea, N,N'-difurfuryl thiourea, N,N'-diphenyl thiourea, N,N'-dicyclohexyl thiourea, and the like. Excellent results have been obtained using 1 to 4 carbon atom alkyl-substituted thioureas such as trimethyl thiourea and tetramethyl thiourea. Examples of cyclic thioureas are those of the formula

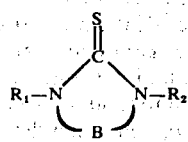

wherein B is an aliphatic group containing 2 to 8 carbon atoms and $R_1$ and $R_2$ are defined as above, such as ethylene thiourea, propylene thiourea, N-methyl ethylene thiourea, dithiouracil, thiobarbituric acid, and the like. More preferred are those aliphatic substituted cyclic thioureas where $R_1$ and $R_2$ are hydrogen or alkyl radicals containing 1 to 4 carbon atoms and B is a $+CH_2+_x$ group where $x = 2$ to 4. Excellent results have been obtained using ethylene thiourea as the thiourea compound.

The thiourea compounds are used in levels from about 0.1 part to about 5 parts by weight, and more preferredly, in from about 0.3 part to about 3 parts by weight per 100 parts by weight of the polymer.

The polymer and cure system can be mixed using internal mixtures such as banbury mixers, extruders, and the like, or mixed on two-roll mills and the like. Many rubber compounding ingredients such as reinforcing agents like carbon blacks, fillers, pigments, antioxidants and stabilizers, especially amine-type antioxidants, plasticizers and lubricants, tackifiers, fungicides, and the like, are readily admixed with the polymer and cure system combination.

The compositions are cured at temperatures from about 225°F. to about 400°F., whereas a more preferred range is from about 300°F. to about 350°F. Cure time varies inversely as temperature, and ranges from about 1 minute to about 60 minutes or more.

The compositions develop rapid and stable cures. The vulcanizates were evaluated as to their button compression set (ASTM D395V), tensile and elongation (ASTM D412), hardness (ASTM D676 - Durometer A), and air test tube aging (ASTM D865). Cure times were determined using a Monsanto rheometer.

The following examples are given to more clearly illustrate the invention. Ingredients are given in the recipes in parts by weight unless otherwise specified.

EXAMPLE I

A diene/nitrile polymer having active halogen cure sites thereon was prepared using an emulsion polymerization process. The polymerization recipe (in parts by weight) and conditions are given below.

| | |
|---|---|
| Butadiene | 66 |
| Acrylonitrile | 32 |
| Vinyl Benzyl Chloride | 2 |
| Alkylbenzene sodium sulfonate | 2 |
| Sodium Salt of Naphthalene Sulfonic Acid | 0.9 |
| Sodium Sulfate | 0.07 |
| Sodium Carbonate | 0.2 |
| Tertiary Dodecyl Mercaptan | 0.4 |
| Sodium Ferric Ethylene Diamine Tetraacetate | 0.035 |
| Sodium Formaldehyde Sulfoxalate | 0.035 |
| Cumene Hydroperoxide | 0.035 |
| Water | 200 |
| Temperature, °C. | 5 |
| Time, hours | 7.5 |
| Percent Conversion | 76 |

The polymerization was stopped by the addition of 0.5 part by weight of 2,4-di(tert-amyl)hydroquinone. The polymer was isolated by coagulation using a 2% by weight calcium chloride solution. Analysis of the polymer showed it to contain about 33% by weight of acrylonitrile (using Kjehldahl method for determination of nitrogen), about 2% by weight of vinyl benzyl chloride (using X-ray fluorescense spectroscopy for determination of chlorine content), and about 65% by weight butadiene. The polymer has a raw polymer Mooney viscosity of about 45 (ML-4 at 100°C.).

Using other diene monomers, other nitrile monomers, and/or other halogen-containing monomers in place of the respective monomers used above, other diene/nitrile polymers having chlorine cure sites are readily prepared. Polymerization ingredients and conditions can vary as known to those skilled in the art. For example, using a similar polymerization process, the following polymers were prepared: a polymer of about 42% by weight of acrylonitrile, about 3% by weight of vinyl benzyl chloride, and about 55% by weight of butadiene; a polymer of about 41% by weight of acrylonitrile, about 3% by weight of β-chloroethyl acrylate, about 56% by weight of butadiene; and a polymer of about 36% by weight of acrylonitrile, about 3% by weight of methyl α-chloroacrylate, and about 61% by weight of butadiene.

EXAMPLE II

Diene/nitrile polymers such as the poly(butadiene/acrylonitrile) rubbers are cured using sulfur or sulfurdonors (i.e., compounds which release sulfur for vulcanization upon heating), or using peroxides and the like. It is well known in the art that sulfur or peroxide cured vulcanizates of these rubbers have unsatisfactory heat resistance, exhibiting substantial changes in tensile, elongation, hardness, flexibility and the like upon heat aging. The use of antioxidants and stabilizers has not provided a completely satisfactory answer. Elemental sulfur cures of the polymers will often exhibit a decrease in tensile after heat aging of over 50 percent. One of the best known cure systems for imparting heat resistance to the vulcanizates is the zinc oxide - tetramethylthiuram disulfide (TMTD) cure system. Use of this system provides vulcanizates which lose between about 25 percent and 50 percent of their tensile after heat aging. A cadmium-magnesium oxide cure system developed by D. A. Paulin (See Rubber Age, October, 1969, page 69) provides excellent heat resistant diene/nitrile rubber vulcanizates. Unfortunately, cadmium compounds are expensive and toxic.

The vulcanizable polymer compositions of the present invention yield, upon cure, excellent heat resistant vulcanizates equal to or better than that obtained using cadmium compounds. The compositions comprise (1) a diene/nitrile polymer having active halogen cure sites, and (2) a cure system consisting essentially of zinc oxide and a thiourea compound.

The following data shows heat resistance of polymer compositions using the TMTD, peroxide, or cadmium type cure systems, along with compositions of the present invention. The polymers used are identified as follows: Polymer A-1, 68% by weight butadiene and 32% by weight acrylonitrile polymer polymerized to 80% conversion of monomers; Polymer A-2, about 68% by weight butadiene and about 32% by weight acrylonitrile polymerized to 90% conversion of monomers; Polymer B-1, about 65% by weight butadiene, about 33% acrylonitrile, and about 2% by weight vinyl benzyl chloride polymerized at a neutral pH; and Polymer B-2, about 65% by weight butadiene, about 33% acrylonitrile, and about 2% by weight vinyl benzyl chloride polymerized at a basic pH.

|  | 1[a] | 2 | 3 | 4 | 5 | 6 |
|---|---|---|---|---|---|---|
| Polymer A-1 | 100 | — | — | — | — | — |
| Polymer A-2 | — | 100 | 100 | 100 | — | — |
| Polymer B-1 | — | — | — | — | 100 | — |
| Polymer B-2 | — | — | — | — | — | 100 |
| N770 Black | 65 | 65 | 65 | 65 | 65 | 65 |
| Stearic Acid | 1 | 1 | 1 | 1 | 1 | 1 |
| Di-α-methyl Styrenated Diphenylamine | 4 | 4 | 4 | 4 | 4 | 4 |
| Zinc Oxide | 5 | 5 | 5 | 5 | 5 | 5 |
| Magnesium Oxide | — | — | — | 5 | — | — |
| Cadmium Oxide | — | — | — | 5 | — | — |
| Cadmium Diethyl Dithiocarbamate | — | — | — | 2.5 | — | — |
| Tetramethyl Thiuram Disulfide | 3.5 | 3.5 | — | — | — | — |
| 2,2'-Benzothiazyl Disulfide | — | — | — | 1 | — | — |
| Sulfur | — | — | — | 0.4 | — | — |
| Dicumyl Peroxide (40% Active) | — | — | 4.0 | — | — | — |
| Ethylene Thiourea | — | — | — | — | 1.5 | 1.5 |
| Cured at 170°C., Time, Minutes | 12 | 10 | 10 | 10 | 15 | 15 |
| Tensile, psi | 2120 | 2500 | 2820 | 2380 | 3110 | 3050 |
| Elongation, percent | 710 | 580 | 400 | 280 | 450 | 470 |
| Hardness, Durometer A | 61 | 59 | 62 | 70 | 65 | 65 |
| Aged 70 Hours at 150°C. | | | | | | |
| Air Test Tube | | | | | | |
| Tensile, psi | 1050 | 1940 | 1650 | 1910 | 2760 | 2590 |
| Percent Change | −51 | −22 | −41 | −20 | −11 | −15 |
| Elongation, Percent | 50 | 140 | 100 | 180 | 140 | 130 |
| Percent Change | −93 | −76 | −75 | −36 | −69 | −72 |
| Hardness, Durometer A | 79 | 76 | 75 | 75 | 78 | 78 |
| Points Change | +18 | +17 | +13 | +5 | +13 | +13 |
| 180° Bend | pass | pass | pass | pass | pass | pass |
| Air Oven | | | | | | |
| Tensile, psi | 1600 | 2350 | 1880 | 1940 | 3270 | 3160 |
| Percent Change | −25 | −6 | −33 | −18 | +5 | +4 |
| Elongation, Percent | 80 | 130 | 100 | 150 | 150 | 140 |
| Percent Change | −89 | −78 | −75 | −46 | −67 | −70 |
| Hardness, Durometer A | 81 | 77 | 78 | 77 | 78 | 80 |
| Points Change | +20 | +18 | +16 | +7 | +13 | +15 |
| 180° Bend | pass | pass | pass | pass | pass | pass |

[a] Average of two experiments

Samples 1, 2 and 3 are compositions known in the art. They represent the best heat resistant diene/nitrile polymer vulcanizates prior to discovery of the cadmium-magnesium oxide cure system (Sample 4). Samples 5 and 6 are vulcanizable compositions within the scope of the present invention. The data shows that the compositions of the present invention, upon heating to cure, yield vulcanizates having much improved heat aging resistance over that of the conventional vulcanizates (Samples 1 to 3). The novel vulcanizable compositions yield results comparable to those obtained using a cadmium-magnesium oxide cure system yet toxic cadmium is not employed. Further, the physical properties, both original and aged, are superior to those of the other samples.

EXAMPLE III

The zinc oxide-thiourea cure system for the diene/nitrile polymers containing active halogen groups is a specific cure system. The following table shows data obtained on cures of the polymer using a variety of cure systems. As shown by the data, only the use of the zinc oxide - thiourea cure system provides the improved heat resistant vulcanizate (Sample 1 versus Samples 2 to 5).

|  | 1 | 2 | 3 | 4 | 5 |
|---|---|---|---|---|---|
| Polymer B-1 | 100 | 100 | 100 | 100 | 100 |
| N770 Black | 65 | 65 | 65 | 65 | 65 |
| Stearic Acid | 1 | 1 | 1 | 1 | 1 |
| Di-α-methyl Styrenated Diphenylamine | 4 | 4 | 4 | 4 | 4 |
| Zinc Oxide | 5 | 5 | — | — | — |
| Cadmium-Barium Soap | — | — | — | — | — |
| Tetramethyl thiuram Disulfide | — | 3.5 | — | — | — |
| 2,2'-Benzothiazyl Disulfide | — | — | — | — | — |
| 4,4'-Dithiomorpholine | — | — | — | — | — |
| Sulfur | — | — | 0.4 | — | — |
| Potassium Stearate | — | — | 4 | — | — |
| Hexamethylene Diamine Carbamate | — | — | — | 1.0 | — |
| Ethylenediamine Carbamate | — | — | — | — | 0.6 |
| Ethylene Thiourea | 1.5 | — | — | — | — |
| Cured at 170°C., Time, Minutes | 15 | 10 | 20 | 15 | 20 |
| Tensile, psi | 3110 | 3280 | 2300 | 2650 | 2560 |
| Elongation, Percent | 450 | 350 | 520 | 430 | 450 |
| Hardness, Durometer A | 65 | 65 | 60 | 62 | 61 |
| Aged 70 Hours at 150°C. | | | | | |
| Air Test Tube | | | | | |
| Tensile, psi | 2760 | 1710 | 950 | 1010 | 940 |
| Percent Change | −11 | −48 | −59 | −62 | −63 |
| Elongation, Percent | 140 | 60 | 40 | 40 | 40 |
| Percent Change | −69 | −83 | −92 | −91 | −91 |
| 180° Bend | pass | pass | fail | fail | fail |
| Air Oven | | | | | |
| Tensile, psi | 3270 | 2050 | 1740 | — | — |
| Percent Change | +5 | −38 | −24 | — | — |
| Elongation, percent | 150 | 80 | 50 | — | — |
| Percent Change | −67 | −77 | −90 | — | — |
| 180° Bend | pass | pass | pass | fail | fail |

EXAMPLE IV

A diene/nitrile polymer having halogen cure sites thereon was cured using various levels of zinc oxide and thiourea compound. Results are given in the following table.

|  | 1 | 2 | 3 | 4 | 5 |
|---|---|---|---|---|---|
| Polymer B-1 | 100 | 100 | 100 | 100 | 100 |
| N770 Black | 65 | 65 | 65 | 65 | 65 |
| Stearic Acid | 1 | 1 | 1 | 1 | 1 |
| Di-α-methyl Styrenated Diphenylamine | 4 | 4 | 4 | 4 | 4 |
| Zinc Oxide | 5.0 | 2.5 | 2.5 | 2.5 | 0 |
| Ethylene Thiourea | 1.5 | 2.25 | 1.5 | 0.75 | 1.5 |
| Tetramethylthiuram Disulfide | — | — | — | — | — |
| Cured at 170°C., Time, Minutes | 15 | 15 | 20 | 20 | 45 |
| Tensile, psi | 3400 | 3490 | 3420 | 3600 | 1040 |
| Elongation, percent | 400 | 400 | 350 | 360 | 740 |
| Hardness, Duro A | 64 | 64 | 65 | 65 | 60 |
| Aged 70 Hours at 150°C. (air test tube) | | | | | |
| Tensile, psi | 2300 | 2670 | 2420 | 2760 | — |
| Percent Change | −32 | −23 | −29 | −23 | — |
| Elongation, percent | 130 | 130 | 120 | 120 | — |
| Percent Change | −67 | −67 | −66 | −67 | — |
| Hardness, Duro A | 77 | 77 | 77 | 77 | 86 |
| Points Change | +13 | +13 | +12 | +12 | +26 |
| 180° Bend | pass | pass | pass | pass | fail |

Samples 1 to 4 are within the scope of the invention. All of these samples provided excellent heat resistant vulcanizates. Sample 5 has no zinc oxide within it, and poor properties were obtained.

EXAMPLE V

Expanding upon the previous examples, a polymer of interpolymerized units of 67% by weight of butadiene, 31% by weight of acrylonitrile, and 2% by weight of vinyl benzyl chloride was cured using various thiourea compounds. Also included in the evaluation were samples containing antioxidants and samples cured using other than zinc oxide. Results of the evaluation are given in the following table.

|  | 1 | 2 | 3 | 4 | 5 | 6 | 7 |
|---|---|---|---|---|---|---|---|
| Polymer | 100 | 100 | 100 | 100 | 100 | 100 | 100 |
| N770 Black | 65 | 65 | 65 | 65 | 65 | 65 | 65 |
| Stearic Acid | 1 | 1 | 1 | 1 | 1 | 1 | 1 |
| Di-α-methyl Styrenated Diphenylamine | 4 | 4 | 4 | 4 | 4 | 4 | 4 |
| Zinc Oxide | 3 | 3 | 3 | 3 | 3 | — | — |
| Magnesium Oxide | — | — | — | — | — | 3 | — |
| Dibasic Lead Phosphite | — | — | — | — | — | — | 3 |
| Ethylene Thiourea | 1.5 | 1.5 | 1.5 | — | — | 1.5 | 1.5 |
| Trimethyl Thiourea | — | — | — | 2 | — | — | — |
| Tetramethyl Thiourea | — | — | — | — | 2 | — | — |
| Antioxidant MB[1] | — | .2 | — | — | — | — | — |

|  | 1 | 2 | -continued 3 | 4 | 5 | 6 | 7 |
|---|---|---|---|---|---|---|---|
| Antioxidant ZMB[2] | — | — | 2 | — | — | — | — |
| Cured 10 minutes at 170°C. | | | | | | | |
| Tensile, psi | 3040 | 2040 | 2400 | 3120 | 3050 | 2500 | 2900 |
| Elongation, percent | 440 | 650 | 600 | 360 | 370 | 400 | 470 |
| Hardness, Duro A | 59 | 58 | 58 | 59 | 59 | 58 | 55 |
| Aged 70 Hrs. at 150°C. Air Oven | | | | | | | |
| Tensile, psi | 2640 | 2940 | 3530 | 2220 | 2380 | 1330 | 950 |
| Percent Change | −13 | +44 | +47 | −29 | −22 | −47 | −67 |
| Elongation, Percent | 110 | 170 | 200 | 80 | 90 | 40 | 40 |
| Percent Change | −75 | −74 | −67 | −78 | −76 | −90 | −91 |
| Hardness, Duro A | 77 | 77 | 75 | 80 | 80 | 80 | 78 |
| Points Change | +18 | +19 | +17 | +21 | +21 | +22 | +23 |
| 180° Bend | pass | pass | pass | pass | pass | pass | pass |

[1] 2-mercaptobenzimidazole
[2] Zinc salt of 2-mercaptobenzimidazole

Samples 1 to 5 are compositions within the scope of the invention. Samples 6 and 7 are not within the scope of the present invention. As the data shows, compositions containing magnesium or lead oxy compounds in place of zinc oxide do not have satisfactory heat aging resistance. Samples 1 to 3 contain a cyclic thiourea compound, while Samples 4 and 5 contain aliphatic thiourea compounds. All five samples yielded, upon cure, excellent heat resistant vulcanizates. Samples 2 and 3 show that the use of an antioxidant in the novel compositions provides even better heat aging resistance.

I claim:

1. A vulcanizable composition comprising (1) a diene/nitrile polymer having a halogen content of from about 0.2 percent to about 5 percent by weight and comprised of interpolymerized units of from 50 percent to about 98 percent by weight of a nonhalogen containing conjugated diene monomer having from 4 to about 10 carbon atoms, from about 15 percent to about 50 percent by weight of a nonhalogen containing monoolefinically unsaturated nitrile monomer having 3 to about 6 carbon atoms, and from about 0.5 percent to about 20 percent by weight of a halogen-containing monomer having a Q value of from about 0.25 to about 3, and (2) a cure system consisting essentially of from about 1 part to about 7 parts by weight of zinc oxide and from about 0.1 part to about 5 parts by weight of a thiourea compound, said parts by weight based upon 100 parts by weight of the polymer.

2. A composition of claim 1 wherein the thiourea compound is selected from the group consisting of thioureas of the formula

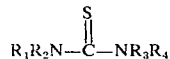

wherein $R_1$, $R_2$, $R_3$, and $R_4$ each are selected from the group consisting of hydrogen, phenol, cycloalkyl of 4 to 8 carbon atoms in the ring, and an aliphatic or cycloaliphatic group containing 1 to about 12 carbon atoms in the group; and thioureas of the formula

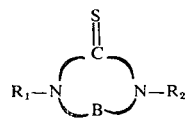

wherein $R_1$ and $R_2$ are defined as above and B is an aliphatic group containing 2 to about 8 carbon atoms.

3. A composition of claim 2 wherein the polymer is comprised of interpolymerized units of from 50 percent to about 98 percent by weight of a non-halogen containing conjugated diene monomer containing 4 to 6 carbon atoms, from about 15 percent to about 50 percent by weight of acrylonitrile or methacrylonitrile, and from about 1 percent to about 5 percent by weight of a halogen-containing monomer selected from the group consisting of halogen-bearing vinylidene hydrocarbons, halogen-containing acrylates, and halogen-containing vinyl ketones.

4. A composition of claim 3 wherein the diene monomer is butadiene or isoprene and the halogen-containing monomer is a halogen-bearing vinylidene hydrocarbon.

5. A composition of claim 4 where in the thiourea compounds $R_1$, $R_2$, $R_3$, and $R_4$ are hydrogen or 1 to 4 carbon atom alkyl radicals and B is a $-(CH_2)_x-$ group where $x$ is 2 to 4.

6. A composition of claim 5 wherein the thiourea compound is selected from the group consisting of trimethyl thiourea, tetramethyl thiourea, and ethylene thiourea.

7. A composition of claim 6 wherein the diene monomer is butadiene, the nitrile monomer is acrylonitrile, and the halogen-bearing vinylidene hydrocarbon is vinyl benzyl chloride.

8. A composition of claim 7 wherein the thiourea compound is ethylene thiourea.

9. A polymer consisting essentially of interpolymerized units of from 50 percent to about 98 percent by weight of a nonhalogen containing conjugated diene monomer having from 4 to about 10 carbon atoms, from about 15 percent to about 50 percent by weight of a nonhalogen containing monoolefinically unsaturated nitrile monomer having from 3 to about 6 carbon atoms, and from about 0.5 percent to about 20 percent by weight of a halogen-containing vinylidene hydrocarbon monomer having a Q value of from about 0.25 to about 3 and selected from the group consisting of halogen-bearing vinylidene hydrocarbons, halogen-containing acrylates, and halogen-containing vinyl ketones.

10. A polymer of claim 9 wherein the polymer is comprised of interpolymerized units of from 50 percent to about 98 percent by weight of a non-halogen containing conjugated diene monomer having 4 to 6 carbon atoms, from about 15 percent to about 50 percent by weight of acrylonitrile or methacrylonitrile, and from about 1 percent to about 5 percent by weight of a halogen-bearing vinylidene hydrocarbon monomer.

11. A polymer of claim 10 wherein the diene monomer is butadiene or isoprene.

12. A polymer of claim 11 wherein the halogen-bearing vinylidene hydrocarbon is vinyl benzyl chloride or vinyl benzyl bromide.

13. A polymer of claim 12 comprised of interpolymerized units of butadiene, acrylonitrile, and vinyl benzyl chloride monomers.

* * * * *